June 7, 1966 E. F. HARGER ETAL 3,254,942
STERILE AIR SUPPLYING APPARATUS
Filed Feb. 4, 1963 2 Sheets-Sheet 1
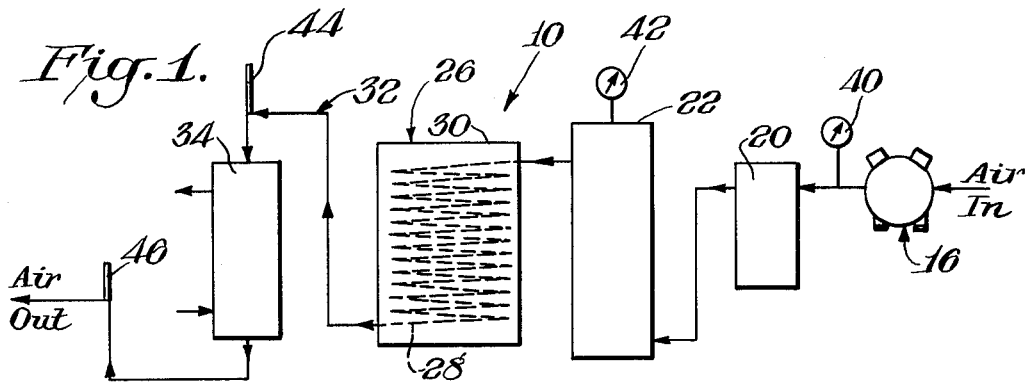
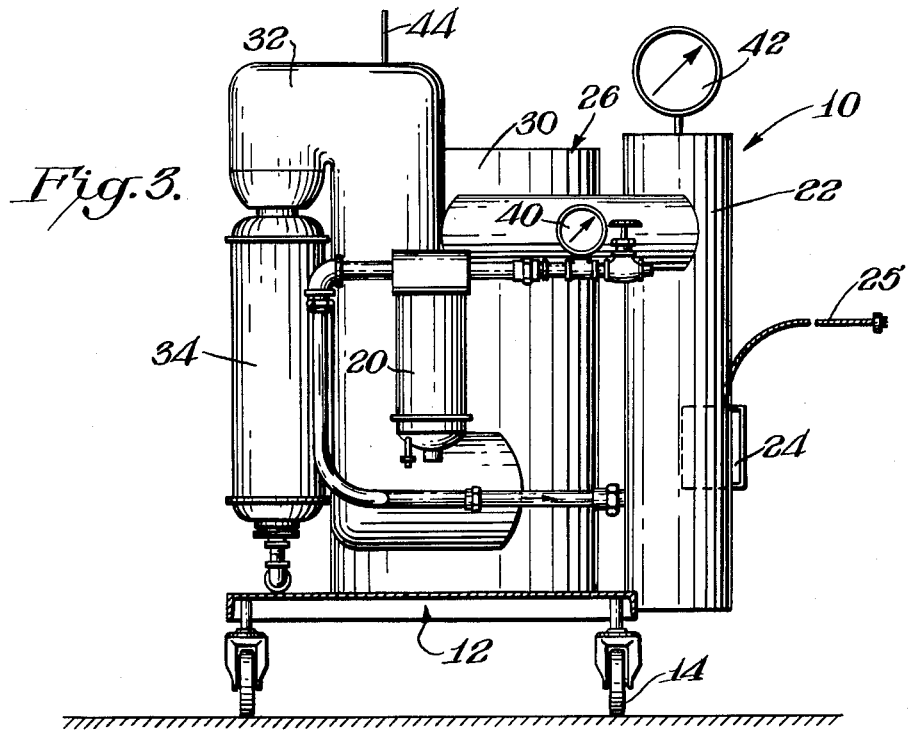
INVENTORS
Enno F. Harger
Henry M. Roger, Jr.
Kenneth B. Tate
BY Connolly and Hutz
ATTORNEYS June 7, 1966    E. F. HARGER ETAL    3,254,942
STERILE AIR SUPPLYING APPARATUS
Filed Feb. 4, 1963    2 Sheets-Sheet 2
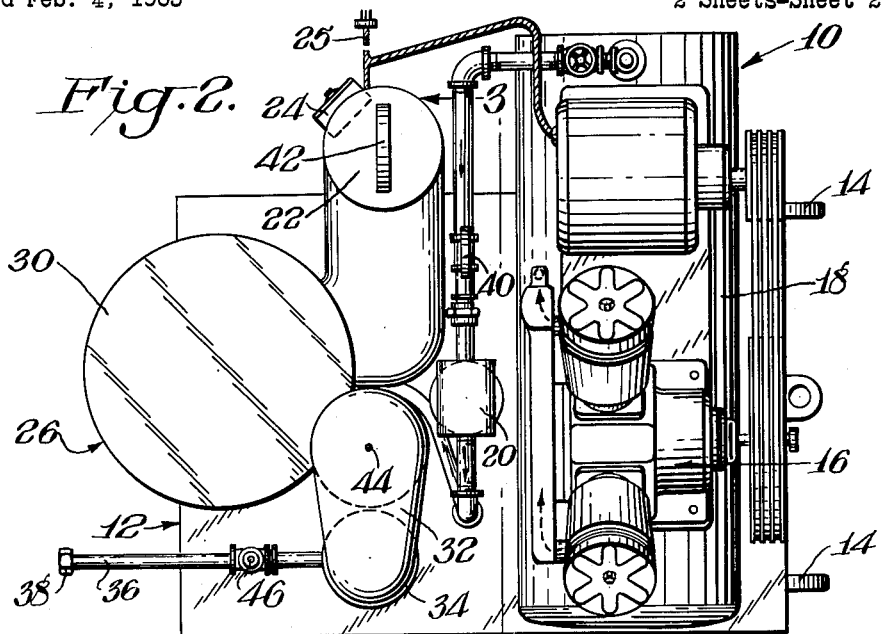
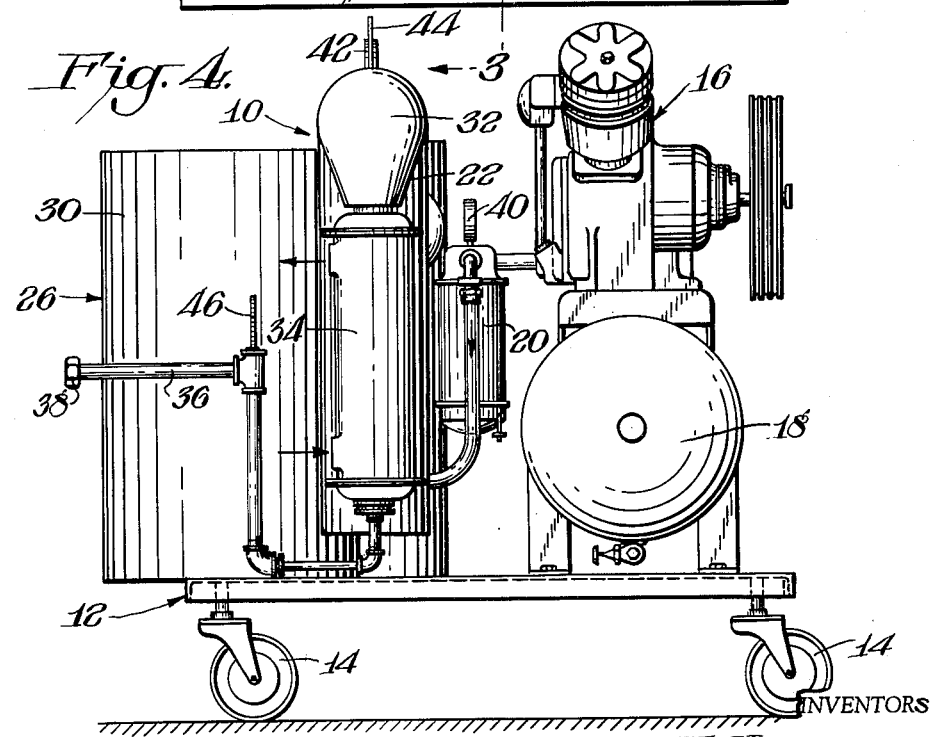
INVENTORS
Enno F. Harger
Henry M. Rogers, Jr.
Kenneth B. Tate
BY Connolly and Hutz
ATTORNEYS ┌──────────────────────────────────────────────┐
United States Patent Office    3,254,942     │
│                                Patented June 7, 1966 │
└──────────────────────────────────────────────┘

3,254,942
STERILE AIR SUPPLYING APPARATUS
Enno F. Harger, Massapequa, N.Y., and Henry M. Rogers, Jr., Gales Ferry, and Kenneth B. Tate, Stonington, Conn., assignors to Chas. Pfizer & Co., Inc., New York, N.Y., a corporation of New York
Filed Feb. 4, 1963, Ser. No. 255,971
7 Claims. (Cl. 21—74)

This invention relates to a portable source of sterile air, and it more particularly relates to a unitary apparatus for supplying a positive flow of sterile air which can be conveniently transported from one operating site to another.

Various industrial processes culture micro-organisms in an air atmosphere. Any contaminant such as bacteriophage in the air can readily interfere with the culture and growth of the desired organism. Although most of these organisms such as those in the cheese industry are vigorous enough to normally withstand bacteriophage and other ordinary air contaminants, their healthy growth is highly stimulated in substantially sterile air, particularly that of starting cultures. However the cost of providing each culture tank, such as cheese culture tanks with a supply of sterile air, is prohibitively expensive.

An object of this invention is accordingly to provide a conveniently portable apparatus for supplying a positive flow of sterile air.

Another object is to provide a simple, economical and unitary form of such an apparatus.

In accordance with this invention the following components are connected in the indicated order in air-conducting series with each other; an air compressor, a filter for removing entrained particles from the air delivered by said compressor, an electric heater for heating the air to a sterilizing temperature, an insulated air temperature retaining unit incorporating an extended air passageway for maintaining the heated air at sterilizing temperatures for a sufficient time to substantially sterilize it, and a fluid-cooled heat exchanger for cooling the air to the predetermined temperature at which it is utilized. These components are mounted as a unit upon a carrier to facilitate their transportation from one site to another where the unit is easily activated by merely connecting an electrical cable to a source of power. A detachable discharge coupling on the air discharge end of the apparatus also facilitates its connection and disconnection from service.

Novel features and advantages of the present invention will become apparent to one skilled in the art from a reading of the following description in conjunction with the accompanying drawings wherein similar reference characters refer to similar parts and in which:

FIG. 1 is a schematic diagram of one embodiment of this invention;

FIG. 2 is a top plan view of an assembled embodiment of the type described in FIG. 1;

FIG. 3 is a cross-sectional view taken through FIG. 2 along the line 3—3; and

FIG. 4 is a front view in elevation of the embodiment shown in FIG. 2.

In FIGS. 1-4 is shown a portable apparatus 10 for supplying a flow of sterile air which includes a number of components mounted in a unitary assembly upon a carrier 12 to facilitate its transportation from one operating site to another. Full swivelling wheel casters 14 are for example connected to the bottom of carrier 12 for facilitating its transportation. However other types of carriers might also be utilized such as those of the pallet type which can be conveniently transported by a fork-lift truck.

The components on carrier 12 are connected in air-conducting series with each other by suitable piping and tubing illustrated in the drawing. The first component in the order of air flow is electric motor-driven 1½ H.P. air compressor 16, which for example delivers a flow of approximately ten to fifteen c.f.m. at 25 p.s.i.

The air delivered from receiver 18 of compressor 16 is cleaned within a filter 20 which is for example a combination flow-separating and removable cartridge type air filter. Filter 20 accordingly removes any particles of dirt or vapor such as water and oil that might be entrained in the air delivered by compressor 16. The air from filter 20 is directed into electrically-heated air heater 22, for example of one kw. output rating, which raises it to a temperature high enough to destroy bacteriophage and other undesirable organisms. The temperature of air heater 22 is regulated by thermostat 24 to which electric supply cord and plug 25 is connected to maintain the temperature in the following insulated air temperature retaining unit 26 at approximately 300° C. or 570° F. An extended air passageway 28 is provided within insulated chamber or tank 30 of insulated air temperature retaining unit 26 by for example a coil of seventy feet of one-half inch copper tubing. The system air flow of for example from three to five c.f.m. is maintained within temperature retaining unit 26 a sufficient time, namely for one to two seconds, to substantially sterilize it. This sterilized air is conducted through insulated outlet header 32 from temperature retaining chamber 26 to cooler 34 which is for example a water-cooled heat exchanger, which cools it down to an optimum culture growing temperature such as 37° C. A flexible hose 36 with a detachable coupling 38 at its end provides a means for connecting the air flow from apparatus 10 to equipment which it supplies. Pressure gauge 40 and thermometers 42, 44 and 46 permit critical pressures and temperatures to be observed during operation of unit 10.

Portable apparatus 10 is accordingly conveniently transported from one site to another wherever a supply of sterile air is required. It therefore provides a uniquely convenient source of substantially sterile air that can be used in the cheese industry for growing cultures in starter tanks free of interference from ordinary air contaminants including bacteriophage. Apparatus 10 accordingly provides a flow of sterile air of three to five c.f.m. which can easily maintain the approximate one-half foot of free space in a one-hundred gallon cheese growing tank under positive sterile air pressure. The portability of the unit makes it available for use in conjunction with any one of a number of culture vessels when cultures are being started in them and the maintenance in them of a sterile atmosphere is most critical. This makes it possible to utilize such apparatus in conjunction with a great number of culture tanks when each most critically requires sterile air. This accordingly makes such apparatus surprisingly economically practical, whereas fixed apparatus permanently connected to each tank would be prohibitively expensive.

What is claimed is:

1. A sterile air supplying apparatus comprising the following components connected in air-conducting series with each other in the following order in the direction of air flow: an air compressor, a filter for removing entrained particles from the air delivered by said compressor, an electric heater for heating said air to a sterilizing temperature, an insulated air temperature retaining unit incorporating an extended air conducting passageway, said passageway being sealed from the remainder of said retaining unit for maintaining said heated air at a sterilizing temperature for a sufficient time to substantially sterilize it, and a fluid-cooled heat exchanger for cooling said air to a predetermined discharge temperature; and said components being mounted in a unit upon a carrier to facilitate its transportation from one site of operation to another.

2. An apparatus as set forth in claim 1, wherein wheels are mounted on said carrier for further facilitating said transportation.

3. An apparatus as set forth in claim 1 wherein said insulated air temperature retaining unit comprises a coil of copper tubing inserted within an insulated chamber, and said copper tubing being spaced from the walls of said chamber.

4. An apparatus as set forth in claim 3 wherein said copper tubing comprises seventy feet of one-half inch copper tubing coiled within said insulated chamber.

5. A sterile air supplying apparatus comprising the following components connected in air-conducting series with each other in the following order in the direction of air flow: a heater for heating said air to a sterilizing temperature, an insulated air temperature retaining unit incorporating an extended air conducting passageway, said passageway being sealed from the remainder of said retaining unit for maintaining said heated air at a sterilizing temperature for a sufficient time to substantially sterilize it, and a fluid-cooled heat exchanger for cooling said air to a predetermined discharge temperature.

6. An apparatus as set forth in claim 5 wherein said insulated air temperature retaining unit comprises a coil of copper tubing inserted within an insulated chamber, and said copper tubing being spaced from the walls of said chamber.

7. An apparatus as set forth in claim 6 wherein said copper tubing comprises approximately seventy feet of one-half inch copper tubing coiled within said insulated chamber.

References Cited by the Examiner
UNITED STATES PATENTS

| | | | |
|---|---|---|---|
| 1,367,517 | 2/1921 | Hostettler | 165—66 |
| 2,150,263 | 3/1939 | Chesney | 21—53 |
| 2,808,124 | 10/1957 | Attwood | 165—68 |

ROBERT A. O'LEARY, *Primary Examiner.*

CHARLES SUKALO, *Examiner.*